US012114145B2

(12) United States Patent
Liu et al.

(10) Patent No.: US 12,114,145 B2
(45) Date of Patent: Oct. 8, 2024

(54) MAGNETIC-POTENTIAL LOUDSPEAKER AND ELECTRONIC DEVICE USING THE SAME

(71) Applicant: GOERTEK INC., Shandong (CN)

(72) Inventors: Chunfa Liu, Shandong (CN); Fenglei Zu, Shandong (CN); Xinfeng Yang, Shandong (CN)

(73) Assignee: GOERTEK INC., Weifang (CN)

(*) Notice: Subject to any disclaimer, the term of this patent is extended or adjusted under 35 U.S.C. 154(b) by 319 days.

(21) Appl. No.: 17/628,386

(22) PCT Filed: Aug. 13, 2019

(86) PCT No.: PCT/CN2019/100302
§ 371 (c)(1),
(2) Date: Jan. 19, 2022

(87) PCT Pub. No.: WO2021/012326
PCT Pub. Date: Jan. 28, 2021

(65) Prior Publication Data

US 2022/0279281 A1 Sep. 1, 2022

(30) Foreign Application Priority Data

Jul. 19, 2019 (CN) ........................ 201910657144.7

(51) Int. Cl.
*H04R 9/06* (2006.01)
*H04R 7/18* (2006.01)
*H04R 9/02* (2006.01)

(52) U.S. Cl.
CPC ................ *H04R 9/06* (2013.01); *H04R 7/18* (2013.01); *H04R 9/025* (2013.01)

(58) Field of Classification Search
CPC . H04R 9/06; H04R 7/18; H04R 9/025; H04R 9/045; H04R 9/00; H04R 9/04;
(Continued)

(56) References Cited

U.S. PATENT DOCUMENTS 9,668,058 B2 * 5/2017 Matsumura .............. H04R 7/18
2008/0159583 A1 * 7/2008 Tanaka ..................... H04R 7/14
381/398
(Continued)

FOREIGN PATENT DOCUMENTS

CN 1350766 A 5/2002
CN 205793329 U 12/2016
(Continued)

OTHER PUBLICATIONS

International Search Report from International Application No. PCT/CN2019/100302 mailed Apr. 17, 2020.

*Primary Examiner* — Carolyn R Edwards
*Assistant Examiner* — Julie X Dang
(74) *Attorney, Agent, or Firm* — Shih IP Law Group, PLLC

(57) ABSTRACT

Disclosed are a magnetic-potential loudspeaker and an electronic device using the same. The magnetic-potential loudspeaker comprises: a movable sound generating device provided with a magnetic conductive material, wherein at least a part of the magnetic conductive material is arranged in an area where an alternating magnetic field overlaps with a static magnetic field, a magnetic field force generated by an interaction between the static magnetic field and the alternating magnetic field is applied to the magnetic conductive material, the movable sound generating device further comprises a diaphragm and a rigidity adjusting portion arranged on at least one surface of the diaphragm; and at least one suspension device, wherein the suspension device comprises an elastic recovery device, an inner fixing portion of the elastic recovery device is fixed to the diaphragm, an outer fixing portion thereof is fixed to an inside of the magnetic-potential loudspeaker, and the rigidity adjusting portion.

15 Claims, 5 Drawing Sheets

(58) Field of Classification Search

CPC ........ H04R 9/043; H04R 1/2811; H04R 7/04; H04R 7/20; H04R 7/16; H04R 2499/11; H04R 29/003; H04R 2209/00; H04R 2209/022; H04R 7/06; H04R 9/02; H04R 2400/11

USPC ........ 381/396, 400, 404, 405, 412, 414, 420

See application file for complete search history.

(56) References Cited

U.S. PATENT DOCUMENTS

| | | | | |
|---|---|---|---|---|
| 2010/0166201 | A1* | 7/2010 | Shim | H04R 9/02 381/71.1 |
| 2014/0133690 | A1* | 5/2014 | Yang | H04R 9/02 381/400 |
| 2015/0171398 | A1* | 6/2015 | Roumi | H01M 10/4257 324/426 |
| 2019/0149924 | A1* | 5/2019 | Cheng | H04R 9/025 381/412 |
| 2020/0059728 | A1* | 2/2020 | Ding | H04R 9/06 |
| 2022/0279280 | A1* | 9/2022 | Liu | H04R 9/06 |

FOREIGN PATENT DOCUMENTS

| | | | | |
|---|---|---|---|---|
| CN | 206226706 | U | * | 6/2017 |
| CN | 207505126 | U | | 6/2018 |
| CN | 207833753 | U | | 9/2018 |
| CN | 110012398 | A | | 7/2019 |
| JP | 2009267779 | A | | 11/2009 |
| JP | 2010021785 | A | | 1/2010 |
| JP | 2013138292 | A | | 7/2013 |
| JP | 5653543 | B1 | | 1/2015 |
| KR | 20150056227 | A | * | 5/2015 |
| WO | 2018040397 | A1 | | 3/2018 |
| WO | 2018095038 | A1 | | 5/2018 |

* cited by examiner

MAGNETIC-POTENTIAL LOUDSPEAKER AND ELECTRONIC DEVICE USING THE SAME

TECHNICAL FIELD

The present disclosure relates to the technical field of transducers, in particular, to a magnetic-potential loudspeaker and an electronic device using the same.

BACKGROUND ART

Various small portable consumer electronic products such as mobile phones, tablets, and laptops are generally equipped with coil motors, which cut magnetic lines to provide driving forces, as driving elements of transducers, such as micro moving-coil loudspeakers. With the tendency for electronic products to be minimized and light, such transducers have been developed to be smaller and thinner.

A moving-coil loudspeaker generally includes a vibration system composed of a coil 4' and a diaphragm 2', and a magnetic circuit system (including a permanent magnet 5') that provides a magnetic field force. When the coil 4' is energized, the diaphragm 2' may be driven to vibrate by a magnetic field force of the magnetic circuit system. The moving-coil loudspeaker includes the coil 4' (copper-based alloy with density greater than 8.9; or aluminum-containing copper wire), which reduces the density but at the same time reduces strength of the lead wires, and thus, it is necessary to optimize the design with special signal lead wires such as a balancing FPC.

A moving-iron transducer generally includes a coil 4', a transmission mechanism 9, a thimble 8, etc, in which a driving component of a movable member (a vibration system) and a suspension member are made of the same material, and a diaphragm 2' moves by deformation. The term "deformation" in the moving-iron transducer means that one end of the movable member is fixed to a fixing portion or is fixed itself, and a large displacement movement occurs on the other end thereof, that is, the movable member is not in a translation motion as a whole.

The inventor has proposed a magnetic-potential transducer, which moves in translation as a whole. The term "translation" means that the periphery of the movable member is fixed to the suspension system and moves as a whole in the same manner. Thus, the movable member in the magnetic-potential transducer generates a greater driving force and may achieve a greater driving volume.

However, in such magnetic-potential transducer, the driving elements is a magnetic conductive material (iron-based alloy with density less than 8) with a smaller volume as a driving element, and thus the vibration mass is lighter. In the case that the movable member moves in translation, when it is used as a sound generating device, it may be limited by the strength and tightness of the movable member. Therefore, a new solution that may increase the strength and improve the tightness while ensuring an enough amount of displacement is required.

SUMMARY

In order to solve the above technical problems, according to an aspect of the present disclosure, there is provided a magnetic-potential loudspeaker including: a movable sound generating device provided with a magnetic conductive material, wherein at least a part of the magnetic conductive material is arranged in an area where an alternating magnetic field overlaps with a static magnetic field, so that the static magnetic field and the alternating magnetic field are converged; a magnetic field force generated by an interaction between the static magnetic field and the alternating magnetic field is applied to the magnetic conductive material so as to drive the movable sound generating device to move, wherein the movable sound generating device further includes: a diaphragm and a rigidity adjusting portion arranged on at least one surface of the diaphragm; and at least one suspension device, wherein the suspension device includes an elastic recovery device for providing a restoring force for a reciprocal vibration of the movable sound generating device, wherein an inner fixing portion of the elastic recovery device is fixed to the diaphragm, an outer fixing portion of the elastic recovery device is fixed to an inside of the magnetic-potential loudspeaker, and wherein the rigidity adjusting portion, the magnetic conductive material, and the inner fixing portion of the elastic recovery device are staggered.

As an improvement, the magnetic conductive material is provided on at least one surface of the diaphragm.

As an improvement, the rigidity adjusting portion has a thickness of 500 μm or less.

As an improvement, the rigidity adjusting portion is made of a material with a density of less than or equal to 2.7 g/cm$^3$, or has a multilayer composite structure including at least the material.

As an improvement, the rigidity adjusting portion covers a portion of the diaphragm that is not covered by the magnetic conductive material and the inner fixing portion of the elastic recovery device.

As an improvement, the alternating magnetic field is a magnetic field generated by a coil with an alternating current passing therethrough and applied to the magnetic conductive material, and the coil and the magnetic conductive material are arranged in a horizontal direction.

As an improvement, the static magnetic field is a magnetic field generated by a permanent magnet, the static magnetic field is arranged on at least one side of the magnetic conductive material in a vertical direction, and the static magnetic field is orthogonal or partially orthogonal to the alternating magnetic field.

As an improvement, the magnetic conductive material is provided in a plurality of magnetic conductive materials, each of the magnetic conductive materials has a sheet shape, the magnetic conductive materials are provided in pairs on both surfaces of the diaphragm, and two magnetic conductive materials opposite to each other are staggered in a direction perpendicular to a vibration direction.

As an improvement, the magnetic conductive materials are provided in two sets, and two alternating magnetic fields and two static magnetic fields are correspondingly provided on the loudspeaker.

As an improvement, the periphery of a diaphragm is sealed to isolate a front chamber and rear chamber of the loudspeaker.

As an improvement, the elastic recovery device has a ring structure as a whole, the outer fixing portion has a closed ring shape, and the inner fixing portion has a closed ring shape; an elastic portion capable of elastic deformation is disposed between the outer fixing portion and the inner fixing portion.

As an improvement, the diaphragm includes a central portion, a flexible deformation portion provided around the central portion, and a connection portion provided around the flexible deformation portion and connected with a bracket; the magnetic conductive material is disposed on the central portion, the flexible deformation portion has a thickness of 50 μm or less and a Young's modulus of 5800 MPa or less.

As an improvement, the magnetic conductive material has a relative permeability μ of greater than 1000.

As an improvement, the magnetic conductive material is composed of a plurality layers of film materials.

According to another aspect of the present disclosure, there is provided a transducer including the magnetic-potential loudspeaker described above.

The magnetic-potential loudspeaker according to the present disclosure has beneficial technical advantages of an improvement of performance.

The magnetic-potential loudspeaker is provided with a rigidity adjusting portion arranged on the diaphragm, which may adjust an integral rigidity of the movable sound generating device, and effectively improve the performance of the high-frequency portion.

Moreover, the core components of the magnetic-potential loudspeaker are a set of magnetic conductive material that may be alternately polarized by the coil surrounding it. The magnetic conductive material as a whole is a part of the movable component, and the alternating magnetic pole converged by the magnetic conductive material is located in a static magnetic field orthogonal or partially orthogonal to the alternating magnetic field, the static magnetic field and the alternating magnetic field may apply forces to the magnetic conductivity material, thereby causing the magnetic conductive material and other movable components to reciprocal motion, and realizing the conversion from alternating electrical signal to reciprocal mechanical motion. The present disclosure solves the problem of an insufficient driving force in a traditional transducer, and improving the electrical-mechanical conversion efficiency in full-band of the transducer.

Moreover, compared with prior art, in the magnetic-potential loudspeaker according to the present disclosure, the magnetic circuit structure for forming the magnetic field is simple in terms of design, the magnetic energy product of the permanent magnet may be fully utilized, and it is unnecessary to consider the performance requirements on the magnetic conductive material as a structural member and a magnetic conductive member at the same time, and thus the material selection can be more flexible.

Moreover, the magnetic-potential loudspeaker according to the present disclosure is mainly composed of a magnetic conductive material, two interacting magnetic fields and a suspension device, the assembly process between the components is simple, and it is beneficial to improve the firmness after combination, and the reliability of the product is good.

Moreover, in the magnetic-potential loudspeaker according to the present disclosure, the rigidity adjusting portion, the magnetic conductive material, and the inner fixing portion of the elastic recovery device are staggered, which significantly improves the integral strength of the movable sound generating device.

According to another aspect of the present disclosure, an electronic device including the magnetic-potential loudspeaker is provided.

Other features and advantages of the present disclosure will be apparent from the following detailed description of exemplary embodiments of the present disclosure with reference to the accompanying drawings.

BRIEF DESCRIPTION OF THE DRAWINGS

The drawings, which are incorporated in the specification and constitute a part of the specification, show embodiments of the present disclosure, and are used to explain the principle of the present disclosure together with the description. In the drawings.

REFERENCE NUMERALS

Figure 1:
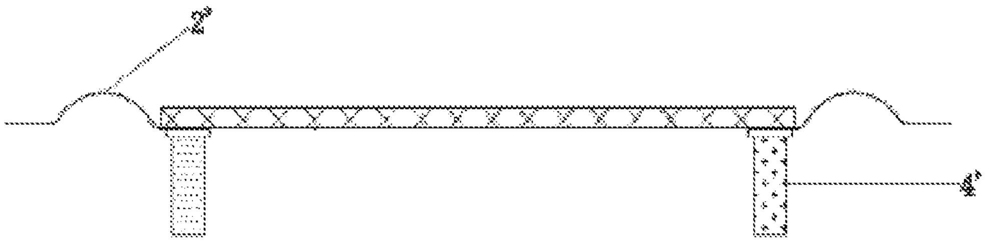
FIG. 1 is a schematic cross-sectional view of a vibration system of a moving-coil loudspeaker in the prior art.
Figure 2:
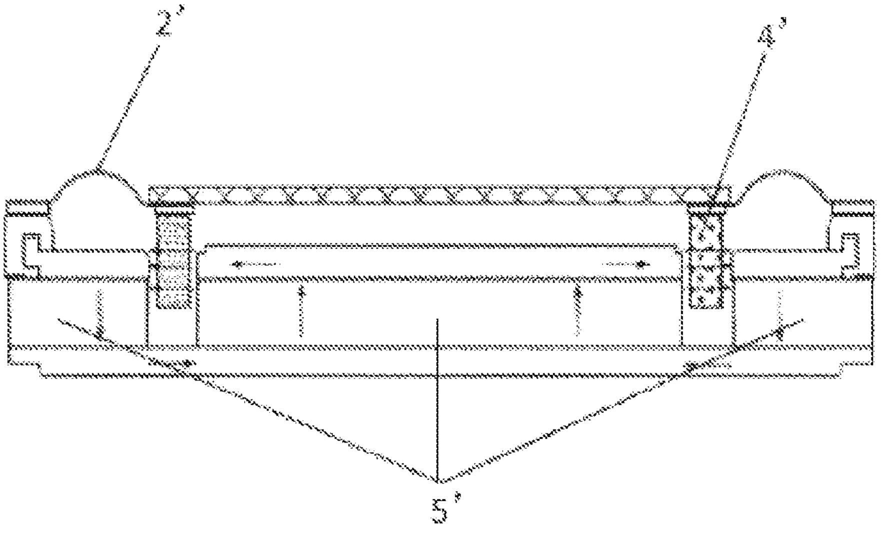
FIG. 2 is a schematic diagram of the overall structure of the moving-coil loudspeaker in the prior art.
Figure 3:
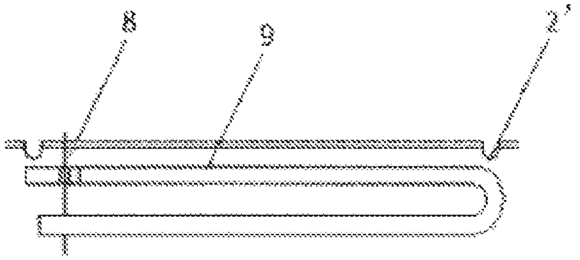
FIG. 3 is a schematic cross-sectional view of a vibration system of a moving-iron loudspeaker in the prior art.
Figure 4:
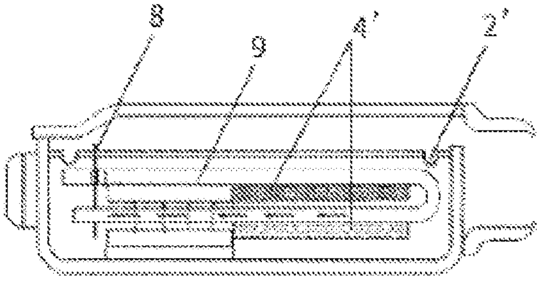
FIG. 4 is a schematic diagram of the overall structure of the moving-iron loudspeaker in the prior art.

1: magnetic conductive material; 11: first set of magnetic conductive material; 12: second set of magnetic conductive material; 2: diaphragm; 2': diaphragm; 3: rigidity adjusting portion; 4: coil; 4': coil; 41: first coil; 42: second coil; 5: permanent magnets; 5': permanent magnets; 51: first permanent magnet; 52: second permanent magnet; 6: suspension device; 7: bracket; 8: thimble; 9: transmission mechanism; A: static magnetic field; B: alternating magnetic field.

DETAILED DESCRIPTION OF THE EMBODIMENTS

Various exemplary embodiments of the present disclosure will now be described in detail with reference to the accompanying drawings. It should be noted that unless specifically stated otherwise, the relative arrangement, numerical expressions and numerical values of the components and steps set forth in the embodiments do not limit the scope of the present disclosure.

The following description of at least one exemplary embodiment is merely illustrative in fact and is in no way intended to be used as any limitation to the present disclosure and its application or use.

The technologies, methods and devices known to those of ordinary skill in the relevant field may not be discussed in detail, but where appropriate, the technologies, methods and devices shall be regarded as a part of the specification.

In all examples shown and discussed herein, any specific value should be construed as merely exemplary and not as a limitation. Therefore, other examples of the exemplary embodiments may have different values.

It should be noted that similar reference numerals and letters refer to similar items in the following drawings.

Therefore, once an item is defined in one drawing, it does not need to be further discussed in subsequent drawings.

The present disclosure provides a magnetic-potential loudspeaker, which includes: a movable sound generating device provided with a magnetic conductive material, wherein at least a part of the magnetic conductive material is arranged in an area where an alternating magnetic field overlaps with a static magnetic field, so that the static magnetic field and the alternating magnetic field are converged, wherein a magnetic field force generated by an interaction between the static magnetic field and the alternating magnetic field is applied to the magnetic conductive material so as to drive the movable sound generating device to move, wherein the movable sound generating device further includes a diaphragm and a rigidity adjusting portion arranged on at least one surface of the diaphragm; and at least one suspension device, wherein the suspension device includes an elastic recovery device for providing a restoring force for a reciprocal vibration of the movable sound generating device, wherein an inner fixing portion of the elastic recovery device is fixed to the diaphragm, an outer fixing portion thereof is fixed to an inside of the magnetic-potential loudspeaker, wherein the rigidity adjusting portion, the magnetic conductive material, and the inner fixing portion of the elastic recovery device are staggered.

Specifically, it will be described in detail with reference to specific embodiments of the present disclosure.

EMBODIMENTS

Figure 5:
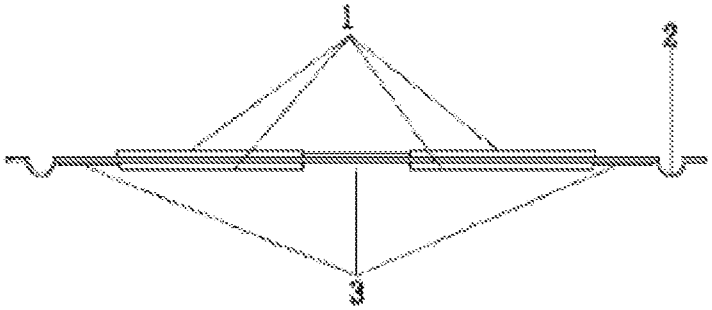
FIG. 5 is a schematic cross-sectional view of a movable sound generating device according to an embodiment of the present disclosure.

FIG. 5 illustrates a movable device of a movable sound generating device of the magnetic-potential loudspeaker of the embodiment. The movable device includes a magnetic conductive material 1, and the magnetic conductive material 1 itself has a magnetic converging function. The movable device further includes a diaphragm 2 connected with and fixed to the magnetic conductive material 1, for example, the magnetic conductive material 1 is provided on at least one surface of the diaphragm 2. The diaphragm 2 may vibrate driven by the magnetic conductive material 1. That is, the movable device may vibrate as a whole.

In the embodiment, there are two sets of magnetic conductive material 1 marked as a first set of magnetic conductive material 11 and a second set of magnetic conductive material 12, each set of magnetic conductive material has two sheet-shaped magnetic conductive material, respectively, and both sets of the magnetic conductive material have a magnetic converging effect. More specifically, the first set of magnetic conductive material 11 and the second set of magnetic conductive material 12 are provided in parallel, and each includes two magnetic conductive materials symmetrically arranged on upper and lower surfaces of the diaphragm 2, respectively. It should be noted that the specific forms and configurations of the magnetic conductive material 1 are not limited to the embodiment. For example, the magnetic conductive material may be provided as one or one set or more sets, which may be in the form of an independent magnetic conductivity metal member, or may be a magnetic conductive material formed by coating on the surface of the diaphragm, or other forms of magnetic conductivity materials. In the case where multiple sets of magnetic conductive materials are provided, the multiple sets of magnetic conductive materials are preferably symmetrically provided on the two opposite surfaces of the diaphragm 2 in consideration of the balance of motion, driving force and other factors, and of course, they may also be staggered. The magnetic conductive material 1 may be in a sheet-like structure, a block-like structure, or other irregular structures. The above-mentioned number, structure, and the positions of the magnetic conductive material 1 are not limited to the structure as illustrated in the embodiment.

The diaphragm 2 of the movable device may be a material with certain flexibility, a central portion thereof is combined with the magnetic conductive material 1, and a portion around the central portion may be an upwardly convex arc structure as shown in the drawing or a downwardly concave arc structure. In addition, an edge portion arranged on the outside of the arc structure may be further included. The diaphragm 2 and the magnetic conductive material 1 vibrate as a whole. In order to improve the phenomenon of split vibration, it is preferable to provide a rigidity adjusting portion 3 in the central portion of the diaphragm 2, and the rigidity adjusting portion 3 is generally formed with a material having high rigidity. As illustrated in FIG. 5, the rigidity adjusting portion 3 may be provided at an edge of the central portion close to the arc structure, and of course, the rigidity adjusting portion 3 may be arranged at other positions, which is also applicable to the embodiment.

The working principle of the movable device will be described below with reference to FIG. 6. It should be understood that in the working process of the magnetic-potential loudspeaker, the motion of the movable device is relay on a driving module, and the driving module in the embodiment includes an external magnetic field and a magnetic conductive material 1. The external magnetic field specifically includes a static magnetic field A, and an alternating magnetic field B. Of course, the "external" in the external magnetic field is named in a perspective of the movable sound generating device, which refers to a magnetic field generated from a member outside the movable sound generating device, and should not be construed as a magnetic field outside the magnetic-potential loudspeaker device.

Preferably, the static magnetic field A is a static magnetic field generated by a permanent magnet 5, and the static magnetic field is arranged in a vertical direction. The alternating magnetic field B is an alternating magnetic field generated by a coil 4, which is an alternating magnetic field generating device, with an alternating current passing therethrough, and the magnetic field is arranged in a horizontal direction and is orthogonal (or partially orthogonal in specific implementation) to the static magnetic field A. The magnetic conductive material 1 is arranged in the horizontal direction, and is arranged in an area where the static magnetic field A overlaps with the alternating magnetic field B. In other words, at least a part of the magnetic conductive material 1 may be located in the overlapping area of the two magnetic fields, and performs a magnetic converging function in the area.

In an ideal state, when the alternating magnetic field generating device (i.e., the coil 4) is not energized, i.e., when the alternating magnetic field has not been generated, the magnetic conductive material 1 itself will be affected by a static magnetic force of the static magnetic field A, and the static magnetic force appears to be equal in magnitude and opposite in direction on both sides of the magnetic conductive material 1, thus the overall force of the static magnetic force is 0, and thus the magnetic conductive material 1 may be maintained in an equilibrium position. In other cases, the static magnetic force applied by the static magnetic field A on the magnetic conductive material 1 is not 0, the magnetic conductive material 1 has a tendency to deviate from the equilibrium position, but, an elastic restoring force can be provided due to an elastic recovery device to keep the magnetic conductive material 1 in the original equilibrium position. The elastic recovery device will be described in detail below with reference to FIG. 7. Here, the interaction between the magnetic field and the magnetic conductive material 1 is explained mainly in combination with FIG. 6.

When the alternating magnetic field B is generated, the magnetic conductive material 1 is located in the area where the static magnetic field A overlaps with the alternating magnetic field B, the magnetic conductive material 1 converges the magnetic field in the area, and an interaction force will be generated between the alternating magnetic field B and the static magnetic field A and applied to the magnetic conductive material, so that the magnetic conductive material 1 drives the movable component C to vibrate.

Specifically, in the embodiment, two coils 4, i.e., first coil 41 and second coil 42, are provided. Correspondingly, two permanent magnets 5, i.e., first permanent magnet 51 and second permanent magnet 52 are provided. The first permanent magnet 51 and the second permanent magnet 52 are arranged opposite to each other on both sides of the magnetic conductive material 1. That is, the first permanent magnet 51 may be provided on the upper side of the magnetic conductive material 1 and the second permanent magnet 52 may be correspondingly provided on the lower side of the magnetic conductive material 1.

In the embodiment, the magnetic conductive material 1 as a driving source drives the vibration device to vibrate. An end of the first set of magnetic conductive material 11 is located in the static magnetic field A generated by the first coil 41, and at least a part of the first set of magnetic conductive material 11 is simultaneously located in the alternating magnetic fields B generated by the first permanent magnet 51 and the second permanent magnet 52. Likewise, an end of the second set of magnetic conductive material 12 is located in the static magnetic field A generated by the second coil 42, and at least a part of the second set of magnetic conductive material 12 is simultaneously located in the alternating magnetic fields B generated by the first permanent magnet 51 and the second permanent magnet 52.

Figure 6:
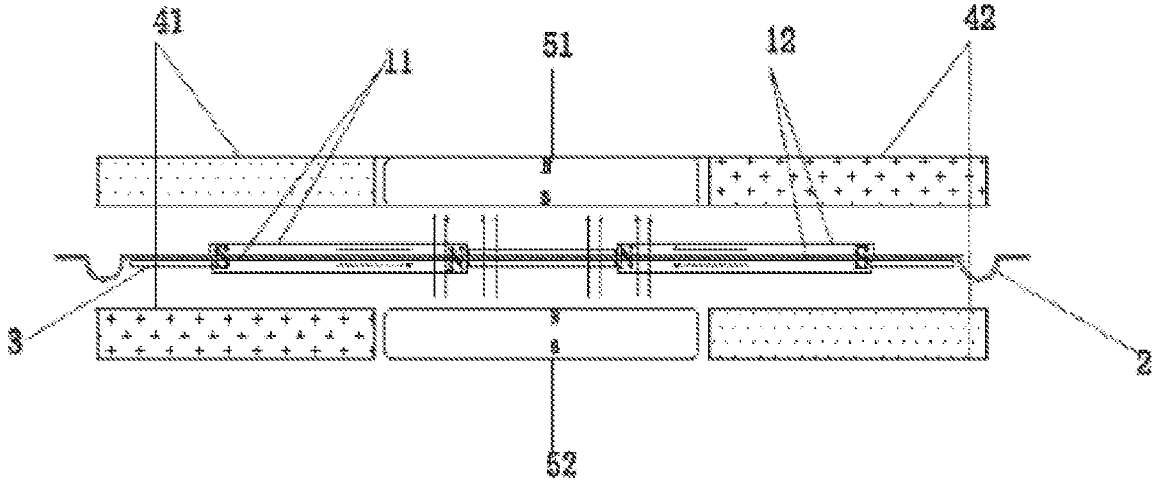
FIG. 6 is a schematic cross-sectional view of a movable sound generating device and a fixed component of the transducer according to an embodiment of the present disclosure.

As illustrated in FIG. 6, the magnetic poles of the opposite ends of the first permanent magnet 51 and the second permanent magnet 52 are opposite. In the embodiment, assumed that the magnetic poles of the opposite ends of the first permanent magnet 51 and the second permanent magnet 52 are an S pole and an N pole respectively, and the magnetic poles of the two ends away from each other are an N pole and an S pole respectively. Likewise, alternating current signals in opposite directions are input to the first coil 41 and the second coil, where "+" means that the current direction is perpendicular to the paper surface inward, "•" means that the current direction is perpendicular to the paper surface outward. The first set of magnetic conductive material 11 is polarized in the alternating magnetic field generated by the first coil 41, and the second set of magnetic conductive material 12 is polarized in the alternating magnetic field B generated by the second coil 42. According to the right-hand rule, the magnetic poles of adjacent ends of the first set of magnetic conductive material 11 and the second set of magnetic conductive material 12 are N poles, and the magnetic poles of the two ends away from each other of the first set of magnetic conductive material 11 and the second set of magnetic conductive material 12 are S poles. The arrows in FIG. 6 respectively show the direction of the magnetic induction line inside the magnetic conductive material 1 after polarization and the direction of the magnetic induction line of the alternating magnetic field B.

Taking the first set of magnetic conductive material 11 as an example, one end thereof is an N pole, one end of the first permanent magnet 51 is an S pole and is close to the N pole of the first set of magnetic conductive material 11, and one end of the second permanent magnet 52 is an N pole and is close to the N pole of the first set of magnetic conductive material 11. So, the first set of magnetic conductive material 11 may be respectively subjected to the attraction and repulsion of the static magnetic field of first permanent magnet 51 and the second permanent magnet 52, and the two forces are in the same direction. Likewise, the second set of magnetic conductive material 12 may also be subjected to the same attraction and repulsion of the static magnetic field of first permanent magnet 51 and the second permanent magnet 52. Meanwhile, driven by a suspension device 6 (described in detail later in conjunction with FIG. 7), the magnetic conductive material 1 may vibrate driven by the alternating magnetic field B and the static magnetic field A.

That is, in such a movable sound generating device, the magnetic conductive material 1 itself participates in the vibration as a whole based on its own magnetic converging effect and the interaction force of two external magnetic fields correspondingly provided, thus it can be used as a driving source driving the motion of the movable sound generating device, and may also be a part of the movable device.

As mentioned above, when the magnetic conductive material 1 moves away from the equilibrium position, it will drive the diaphragm 2 coupled thereto to vibrate together.

Of course, the embodiment illustrates is only an example. The directions of the magnetic induction lines of the alternating magnetic field B and the static magnetic field A are not limited to the directions shown in the drawings. For example, the magnetic poles of the opposite ends of the first permanent magnet 51 and the second permanent magnet 52 may be opposite to those shown in the drawings. In addition, the current directions of the first coil 41 and the second coil 42 may also be opposite to those shown in the drawings. Accordingly, the polarities of the adjacent ends and the ends away from each other after polarization of the two sets of magnetic conductive material may be opposite, but corresponding attraction and repulsion forces will also be generated and the reciprocal motion will also be realized through the alternating magnetic field and the static magnetic field.

For the movable sound generating device, the core components are a set of magnetic conductive material that may be alternately polarized by the coil surrounding it. The magnetic conductive material as a whole is a part of the movable component, and the alternating magnetic pole converged by the magnetic conductive material is located in a static magnetic field orthogonal or partially orthogonal to the alternating magnetic field, the he static magnetic field and the alternating magnetic field may apply forces to the magnetic conductivity material, thereby causing the magnetic conductive material and other movable components to reciprocal motion, and realizing the conversion from alternating electrical signal to reciprocal mechanical motion. The present disclosure solves the problem of an insufficient driving force in a traditional magnetic-potential loudspeaker, and improving the electrical-mechanical conversion efficiency in full-band of the magnetic-potential loudspeaker. In addition, the movable sound generating device has a firm structure and is simple to assemble.

Figure 7:
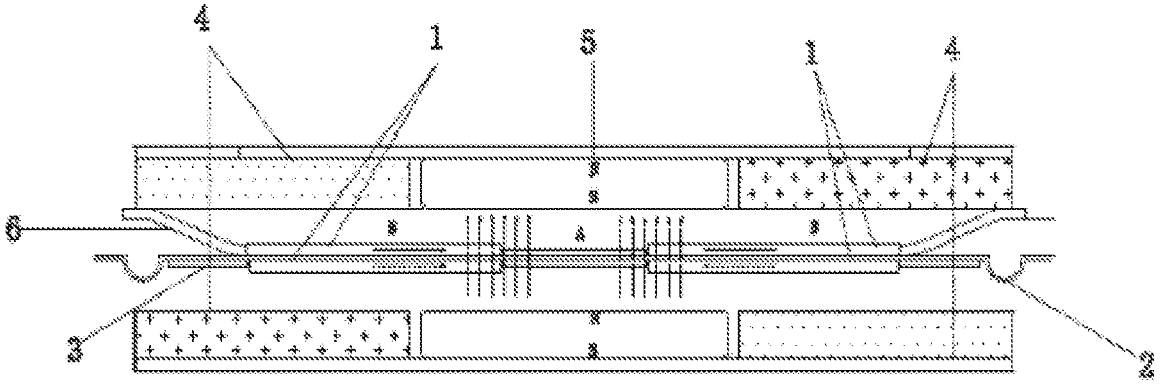
FIG. 7 is a schematic cross-sectional view of a part of the magnetic-potential loudspeaker according to an embodiment of the present disclosure.

Continuing to refer to FIG. 7, the movable sound generating device further includes a suspension device 6. The main function of the suspension device 6 is to provide an elastic restoring force to the movable device when the device moves.

As mentioned in the Background Art, in the micro-transducer in the field of consumer electronics, efforts made to improve the driving force or reduce a first-order resonance frequency to improve the low-frequency performance may cause anti-rigidity in the magnetic circuit. For convenience of explanation, the concepts of the first-order resonant frequency and the anti-rigidity will be explained hereinafter. The first-order resonant frequency refers to a resonant frequency in the first-order mode. The anti-rigidity which is also referred to as magnetic rigidity, refers to, when the magnetic conductive material (including soft and hard magnetic materials) approaches an area with high magnetic flux density, a force applied to it gradually increases and is in a direction in which it moves, the ratio of variation of the force to the displacement is referred to as the anti-rigidity of the magnetic conductive material.

For a micro-transducer, a general design principle is meeting the requirements for driving force is a first priority, which may result in excessive anti-rigidity. In order to solve this technical problem, a suspension device 6 is further provided to reduce the excessive anti-rigidity. In the embodiment, specifically, the suspension device 6 includes an elastic recovery device, one end of the elastic recovery device is fixed to the movable sound generating device, and the other end thereof is fixed to the inside of the magnetic-potential loudspeaker. When the movable sound generating device reciprocally moves, the device may provide an elastic force to restore it to the equilibrium position. Specifically, the suspension device 6 selected from a leaf spring with an elastic bar, a spring, or other elastic components, may be provided as an independent ring-shaped component, or may be provided as one or more groups of separated components, as long as it is made of elastic materials to provide elastic force, and one end thereof is fixed to the movable sound generating device and the other end thereof is fixed to the inside of the magnetic-potential loudspeaker.

In the embodiment, as illustrated in FIG. 7, the leaf spring has a first fixing end fixed to the magnetic-potential loudspeaker and a second fixing end fixed to the magnetic conductive material 1, and there is a height difference between the first fixing end and the second fixing end in a vibration direction of the movable sound generating device, thus the leaf spring may provide an elastic restoring force due to an elastic deformation in the vibration direction.

Based on the above description, in the embodiment, the leaf spring, used as the suspension device 6, provides the elastic restoring force for the reciprocal motion of the movable component. Further, the edge portion of the diaphragm 2 actually functioned as a part of the elastic recovery device as well.

Figure 9:
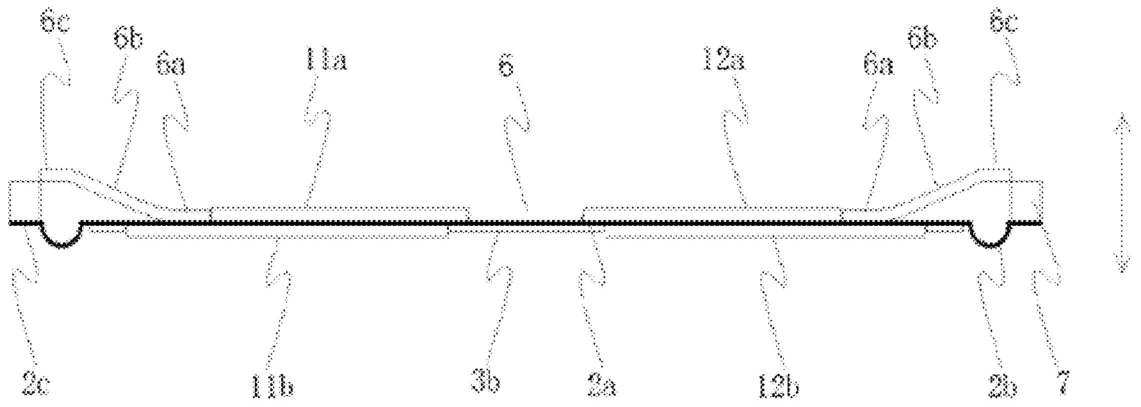
FIG. 9 is a schematic cross-sectional view of a movable sound generating device according to another embodiment of the present disclosure.
Figure 10:
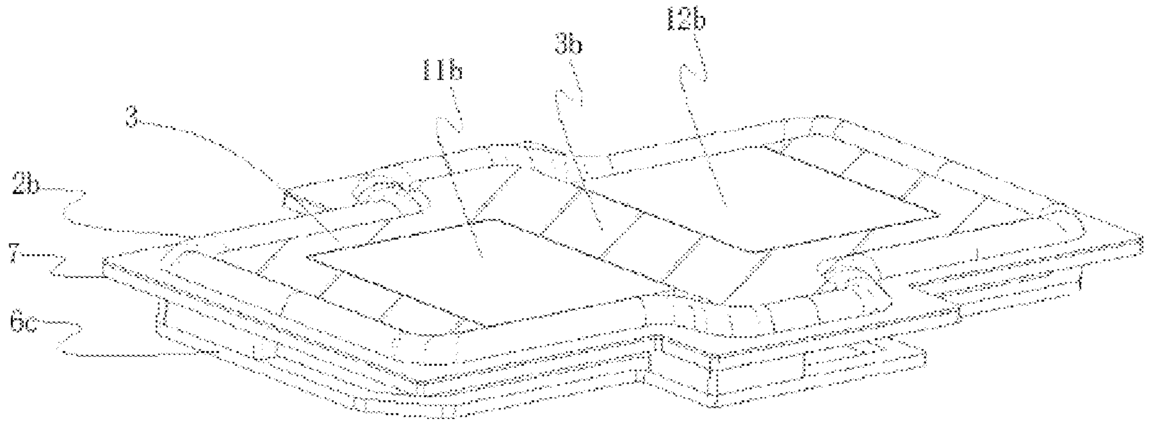
FIGS. 10 and 11 are perspective views of the movable sound generating device according to another embodiment of the present disclosure.
Figure 11:
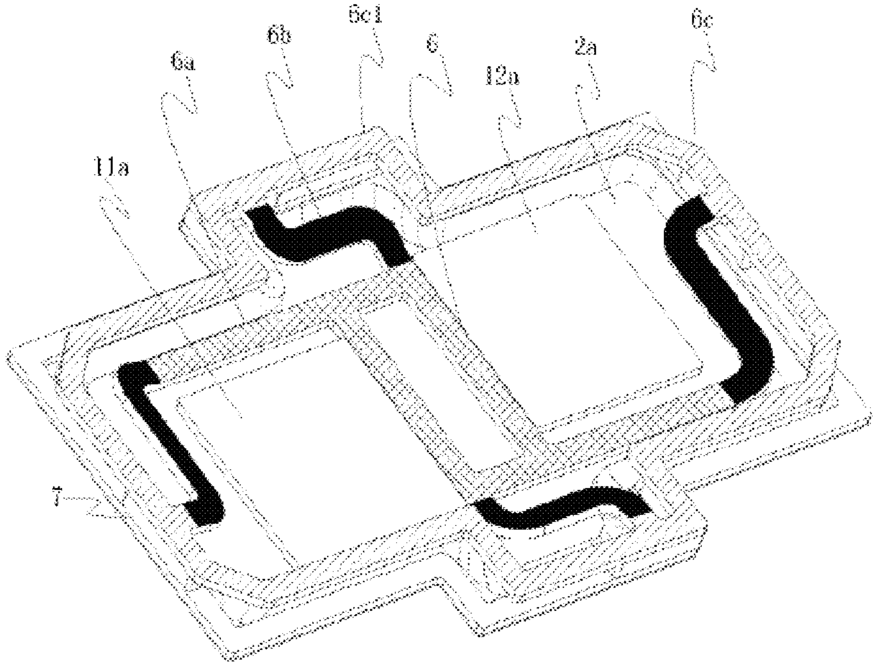

FIG. 9 is a schematic cross-sectional view of a movable sound generating device according to another embodiment of the present disclosure. FIGS. 10 and 11 are perspective views of the movable sound generating device according to another embodiment of the present disclosure, and FIG. 11 is a back view.

In this embodiment, the magnetic conductive material has a sheet shape. The magnetic conductive material is provided as a plurality of magnetic conductive materials, and is provided in pairs on both surfaces of the diaphragm 2, for example, on two surfaces perpendicular to the vibration direction. The arrows in FIG. 9 indicate the vibration direction. The two magnetic conductive materials of the magnetic conductive material, which are disposed opposite to each other, are staggered in a direction perpendicular to the vibration direction. As illustrated in FIG. 9, two magnetic conductive materials 11*a*, 11*b* opposite to each other and two magnetic conductive materials 12*a*, 12*b* opposite to each other are partially overlapped and partially not overlapped in the direction perpendicular to the vibration direction so as to be staggered. In this example, the magnetic conductive material may enhance the overall strength of the movable device by its own strength.

For example, the magnetic conductive material has a relative permeability μ of greater than 1000. Within this range, the magnetic conductive material may be magnetized by the coil 4.

For example, the magnetic conductive material is composed of a plurality layers of film materials, which results in the advantages of high structural strength and high reliability.

In an example, as illustrated in FIGS. 9 and 10, the diaphragm includes a central portion 2*a*, a flexible deformation portion 2*b* provided around the central portion 2*a*, and a connection portion 2*c* provided around the flexible deformation portion 2*b* and connected with a bracket 7. The magnetic conductive materials 11*a*, 11*b*, 12*a*, 12*b* are disposed on the central portion. The flexible deformation portion has a thickness of 50 μm or less and a Young's modulus of 5800 MPa or less. Within this range, the diaphragm has a good sound generating effect.

The rigidity adjusting portion, the magnetic conductive material, and the inner fixing portion of the elastic recovery device are staggered. As illustrated in FIG. 9, the rigidity adjusting portion 3 is attached to one surface of the diaphragm. For example, the rigidity adjusting portion 3 is located on a surface of the diaphragm opposite to the suspension device 6. The rigidity adjusting portion 3 has a predetermined rigidity, which on the one hand, may enhance the structural strength of the movable device to reduce the split vibration of the movable device, and on the other hand, may adjust the rigidity of the movable device to improve the vibration effect.

The rigidity adjusting portion 3 is staggered with a plurality of magnetic conductive materials located on the surface. For example, as illustrated in FIG. 10, the device includes two magnetic conductive materials 11*b*, 12*b*. The two magnetic conductive materials 11*b*, 12*b* are centrally symmetric with respect to the center of the diaphragm. The rigidity adjusting portion 3 is an integral structure. The rigidity adjusting portion 3 forms opening areas at a position corresponding to the two magnetic conductive materials 11*b*, 12*b*, and two opening areas formed thereby have openings in opposite directions. The rigidity adjusting portion 3 has an S-shape as a whole, so as to be staggered with the two magnetic conductive materials 11*b*, 12*b*. In this way, the structural strength of the movable device is significantly improved.

Optionally, the rigidity adjusting portion 3 has a thickness of 500 μm or less. Within this range, the movable device has a small thickness and is more sensitive in vibration.

Optionally, the rigidity adjusting portion 3 is made of a material with a density of less than or equal to 2.7 g/cm$^3$. For example, the rigidity adjusting portion 3 is made of a metal material, such as aluminum.

Alternatively, the rigidity adjusting portion 3 is a multi-layer composite structure including at least one type of material. The one type of material has a density of less than or equal to 2.7 g/cm$^3$. For example, the rigidity adjusting portion 3 includes a core layer of a metal material and a plastic layer covering a surface of the core layer. The metal material may be, for example, aluminum.

Generally, a stress concentration may be easily occurred in a middle portion, especially a middle portion of a length direction, of the movable device, resulting in deformation of the diaphragm in this area.

As illustrated in FIGS. 10 and 11, the elastic recovery device includes an inner fixing portion 6*a*, an outer fixing portion 6*c*, and an elastic portion 6*b* arranged between the inner fixing portion 6*a* and the outer fixing portion 6*c*. The inner fixing portion 6*a* is fixed to the diaphragm, and the outer fixing portion is fixed to an inside of the magnetic-potential loudspeaker. The inner fixing portion 6*a* is staggered with respect to the magnetic conductive material and the rigidity adjusting portion arranged on surface. For example, the suspension device uses an elastic metal material with a Young's modulus of greater than 200 MPa, so that the suspension device has a sufficient elastic restoring force. The movable device includes two magnetic conductive materials 11*a*, 11*b*, which are centrally symmetric with respect to the center of the diaphragm. The suspension device 6 has a centrosymmetric structure, and forms two opening areas at a position corresponding to the two magnetic conductive materials 11*a*, 12*a*. The two opening areas have openings in opposite directions. The elastic recovery device has an S-shape as a whole, so as to be staggered with respect to the two magnetic conductive materials 11*a*, 12*a*. In this way, the structural strength of the movable device is significantly improved.

In addition, since the movable device is formed as a centrosymmetric structure as a whole, the vibration of the movable device may be more equalized and the occurrence of polarization may be reduced.

In an example, as illustrated in FIGS. 10 and 11, the suspension device has a ring structure as a whole, the outer fixing portion has a closed ring shape, and the inner fixing portion has a closed ring shape. The elastic force of each portion of the ring structure is balanced, which may effectively reduce the occurrence of polarization.

In addition, both the outer fixing portion and the inner fixing portion are in a closed ring shape, which results in a high combining strength between the suspension device and the diaphragm and the inside of the magnetic-potential loudspeaker.

For example, the suspension device has a rectangular ring structure as a whole. The rectangular ring structure includes two long sides and two short sides. The length of the long side is greater than the length of the short side. The elastic portion includes elastic bars 6*b* arranged at the four sides of the rectangular structure. Convex portions 6*c*1 for accommodating the elastic bars 6*b* are formed on the two long sides of the rectangular structure. For example, the convex portions 6*c*1 may be formed at an edge portion 6*c*. The elastic bars 6*b* are located at an inside of the convex portions 6*c*1, and the length of the elastic bar 6*b* may be effectively increased by providing the convex portion, thereby increasing the amplitude of the system.

In an example, the rigidity adjusting portion 3 covers a portion 3*b* of the diaphragm that is not covered by the magnetic conductive material and the inner fixing portion of the elastic recovery device. As such, the diaphragm 2 may be covered at least in the central portion, which may significantly improve the overall strength of the movable sound generating device.

It should be noted that when the above-mentioned central portion, magnetic conductive material, rigidity adjusting portion 3 and suspension device are combined, it should be ensured that the magnetic conductive material, the rigidity adjusting portion 3, etc. are complete and is prevented from air leakage; the flexible deformation portion of the diaphragm should have sufficient elastic deformation and be complete and is prevented from air leakage, so that the diaphragm has a good sound generating effect.

In the structure of the embodiment, the force balance device is composed of an anti-rigidity balance device and a movable device (including the diaphragm 2 and the magnetic conductivity material 1), and the following factors may be considered when determining the specific configurations thereof:

1) The anti-rigidity of the micro magnetic-potential loudspeaker is measured through simulation or experiment. If the anti-rigidity is non-linear, it is necessary to measure a curve of the static magnetic field force received by the movable device varying with respect to its displacement through simulation or measurement; and 2) Obtain the rigidity requirements of the force balance device according to the design requirements for the first-order resonant frequency and the measurement results of the anti-rigidity. Design at least one anti-rigidity balance device, which may have various forms, such as the aforementioned leaf spring, spring, magnetic spring, etc., according to the requirements and the internal spatial structure of the micro magnetic-potential loudspeaker.

In addition to the above factors, the design of the anti-rigidity balance device shall follow its own requirements: in the case of the leaf spring or springs, it is necessary that a stress generated when it is stretched or compressed to an ultimate displacement is less than the yield strength of the member; and in the case of the magnetic springs, it is necessary that when it is stretched or compressed to an ultimate displacement, it does not exceed the range of the magnetic field force thereof.

It can be seen that in the embodiment, in addition to the elastic recovery function of the diaphragm 2, the excessive anti-rigidity may be reduced by additionally providing an anti-rigidity balance device. Such design may bring the following advantages:

a) The rigidity of the force balance device is individually designed to reduce the anti-rigidity, and thus the driving force may be designed independently without considering the magnitude of anti-rigidity;
b) The rigidity of the force balance device is only dependent on its own structure, so that the total rigidity of the system may be adjusted by adjusting the rigidity, thereby indirectly adjusting the first-order resonant frequency of the system.

The total rigidity of the system is obtained by superposition of the anti-rigidity and rigidity of the movable sound generating device, so that the total rigidity is always less than the rigidity of the movable sound generating device. Since the first-order resonant frequency of the micro magnetic-potential loudspeaker is positively correlated with the total rigidity of the system, the first-order resonant frequency may be sufficiently reduced by adjusting the anti-rigidity of the system, thereby effectively improving the low-frequency performance of the micro magnetic-potential loudspeaker.

Figure 8:
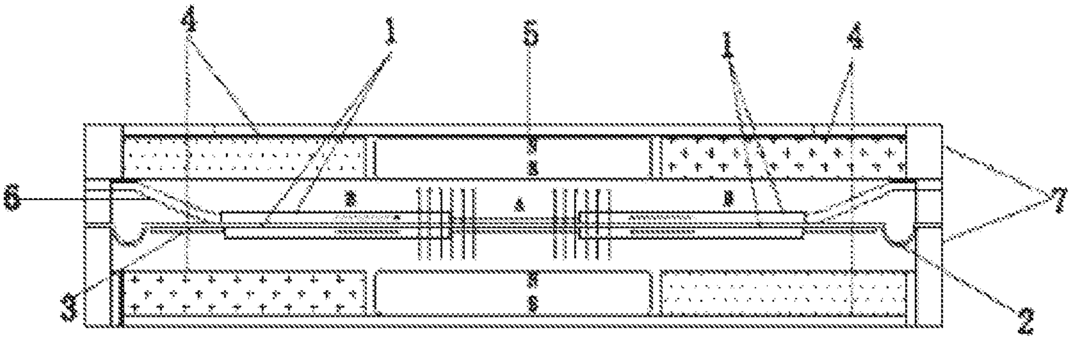
FIG. 8 is a schematic cross-sectional view of the overall structure of the magnetic-potential loudspeaker according to an embodiment of the present disclosure.

Further, as illustrated in FIG. 8, the magnetic-potential loudspeaker further includes a bracket 7, which provides a peripheral frame of the magnetic-potential loudspeaker, and on which the edge portion of the diaphragm 2 is fixed. The periphery of the diaphragm 2 is sealed to define a front chamber and rear chamber of the magnetic-potential loudspeaker. In a specific embodiment, the specific structure of the bracket 7 is not limited, and it may be a ring-shaped housing integrally formed and provided with an opening, or may be a housing assembly composed of a plurality of independent housing members connected and fixed to each other. For a loudspeaker, a sound hole is may be provided on the bracket 7, a sound wave generated by the vibration of a vibrator propagates to the outside through the sound hole, so as to realize a sound generating function.

The magnetic-potential loudspeaker according to the embodiment of the present disclosure is further illustrated in a perspective of the assembly of the magnetic-potential loudspeaker. As illustrated in FIGS. 7 and 8, the bracket 7 provides a peripheral frame, wherein each of the permanent magnet 5, the first coil 41 and the second coil 42 may be positioned in the frame provided by the bracket 7, and specifically, the first coil 41, the permanent magnet 5 and the second coil 42 are assembled sequentially from left to right in the horizontal direction. That is, the first coil 41 and the second coil 42 are respectively fixed to both sides of the permanent magnet 5 and spaced apart from the permanent magnet 5 by a certain distance. After the two permanent magnets are installed correspondingly, a vibration space is formed in the vibration direction of the magnetic-potential loudspeaker, the diaphragm 2 and the magnetic conductive material 1 that drives the diaphragm 2 are assembled in the vibration space; the magnetic conductive material 1 is connected to and fixed to the surface of the diaphragm 2, and is spaced apart from the first permanent magnet 51 and the second permanent magnet 52 by a certain distance, so that a space for a reciprocal motion driven by the alternating magnetic field B and the static magnetic field A may be ensured. A first fixing portion of the anti-rigidity balance device is disposed on a wall of the bracket 7, and a second fixing portion is fixed to the movable sound generating device to additionally provide an independent elastic restoring force.

As mentioned above, the magnetic conductive material 1 may vibrate as a whole in the magnetic-potential loudspeaker. Herein, "vibrate as a whole" means that the magnetic conductive material 1 is freely disposed on the suspension device 6 and its boundary is not clamped on other components, which is essentially different from the U-shaped or T-shaped armature structure of the moving-iron transducer described above. According to the present disclosure, problems usually occur in the moving-iron magnetic-potential loudspeaker, for example, the armature line is too long, the magnetic field attenuates greatly along its path, a large magnetic leakage occurs at its bending area (clamping area) and the driving performance is rapidly decreased, are avoid. Further, the product is not limited to the size. In the present disclosure, the magnetic conductive material 1 drives the movable component to vibrate through the interaction between the static magnetic field A and the alternating magnetic field B, and according to the principle of magnetomotive force balance, i.e., the total magnetic potential of the system remains remain unchanged within a certain range and the magnetic field is distributed in accordance with the principle of minimum potential energy of current and magnetic flux, and the driving force may be effectively improved according to the principle of magnetic potential while maintaining a lightweight of existing micro magnetic-potential loudspeakers.

It should be noted that: 1) The magnetic conductive material 1 may have a flat sheet structure, may be provided as one piece, or two pieces, or may be provided as multiple sets, and the number of magnetizers provided for each set of magnetic conductive material is not limited. Also, the magnetic conductive material is not limited to an independent magnetizers. For example, when the magnetic conductive material is formed on the diaphragm, it may be a magnetic conductive material covering a part of the surface of the diaphragm by coating on the surface of the diaphragm. 2) In order to reduce the vibration of the movable device, the magnetic conductive material is preferably symmetrically provided on both surfaces of the diaphragm 2, and of course, when there are multiple sets of magnetic conductive material, they may be staggered. 3) In specific implementations, the present disclosure may be applied not only to a square magnetic-potential loudspeaker, but also to a circular or other shaped magnetic-potential loudspeaker structure, and accordingly, the diaphragm may be square or circular or the like. 4) The number of static magnetic field generating device, alternating magnetic field generating device, movable device and suspension device in the magnetic-potential loudspeaker may be one or more, for example, when the permanent magnet that generates the static magnetic field consists of a plurality of magnet groups, the number of the permanent magnets provided on the upper side of the magnetic conductive material 1 is preferably equal to those on the lower side of the magnetic conductive material 1, and they are provided in one-to-one correspondence, which is benefit to the balance of the static magnetic field force. Of course, the design may be flexible according to specific requirements. 5) The present embodiment shows a magnetic-potential loudspeaker structure, in which the magnetic conductive material 1 drives the diaphragm 2 to vibrate so as to generate sound waves to the outside. Of course, it may also be applied to structures such as a motor, and when used in a motor, it may further drive other vibration components (for example, balancing weight) to vibrate driven by the magnetic conductive material 1.

The movable sound generating device of the magnetic-potential loudspeaker of the present disclosure has excellent adaptability to products of different sizes and may be widely used in electronic devices. The micro-loudspeakers described in the embodiments are only preferred embodiments. The present disclosure may also be applied to motors or large speakers, and the application fields including motors, automotive electronics, audios, mobile phones, tablets and many other fields.

Although some specific embodiments of the present disclosure have been described in detail by way of example, those skilled in the art should understand that the above examples are only for illustration and are not intended to limit the scope of the present disclosure. Those skilled in the art should understand that the above embodiments can be modified without departing from the scope and spirit of the present disclosure. The scope of the present disclosure is defined by the appended claims.

What is claimed is:

1. A magnetic-potential loudspeaker, comprising:

a movable sound generating device provided with a magnetic conductive material, wherein at least a part of the magnetic conductive material is arranged in an area where an alternating magnetic field overlaps with a static magnetic field, so that the static magnetic field and the alternating magnetic field are converged, and a magnetic field force generated by an interaction between the static magnetic field and the alternating magnetic field is applied to the magnetic conductive material so as to drive the movable sound generating device to move, wherein the movable sound generating device further comprises:

a diaphragm and a rigidity adjusting portion arranged on at least one surface of the diaphragm; and at least one suspension device, wherein the suspension device comprises an elastic recovery device for providing a restoring force for a reciprocal vibration of the movable sound generating device, wherein an inner fixing portion of the elastic recovery device is fixed to the diaphragm, an outer fixing portion of the elastic recovery device is fixed to an inside of the magnetic-potential loudspeaker, and wherein the rigidity adjusting portion, the magnetic conductive material, and the inner fixing portion of the elastic recovery device are staggered.

2. The magnetic-potential loudspeaker of claim 1, wherein the magnetic conductive material is provided on at least one surface of the diaphragm.

3. The magnetic-potential loudspeaker of claim 1, wherein the rigidity adjusting portion has a thickness of 500 μm or less.

4. The magnetic-potential loudspeaker of claim 1, wherein the rigidity adjusting portion is made of a material with a density of less than or equal to 2.7 $g/cm^3$, or has a multilayer composite structure including at least the material.

5. The magnetic-potential loudspeaker of claim 1, wherein the rigidity adjusting portion covers a portion of the diaphragm that is not covered by the magnetic conductive material and the inner fixing portion of the elastic recovery device.

6. The magnetic-potential loudspeaker of claim 1, wherein the alternating magnetic field is a magnetic field generated by a coil with an alternating current passing therethrough and applied to the magnetic conductive material, and the coil and the magnetic conductive material are arranged in a horizontal direction.

7. The magnetic-potential loudspeaker of claim 1, wherein the static magnetic field is a magnetic field generated by a permanent magnet, the static magnetic field is arranged on at least one side of the magnetic conductive material in a vertical direction, and the static magnetic field is orthogonal or partially orthogonal to the alternating magnetic field.

8. The magnetic-potential loudspeaker of claim 1, wherein the magnetic conductive material is provided in a plurality of magnetic conductive materials, each of the magnetic conductive materials has a sheet shape, the magnetic conductive materials are provided in pairs on both surfaces of the diaphragm, and two magnetic conductive materials opposite to each other are staggered in a direction perpendicular to a vibration direction.

9. The magnetic-potential loudspeaker of claim 8, wherein the plurality of magnetic conductive materials are provided in two sets, and two alternating magnetic fields and two static magnetic fields are correspondingly provided on the loudspeaker.

10. The magnetic-potential loudspeaker of claim 1, wherein a periphery of the diaphragm is sealed to define a front chamber and a rear chamber of the magnetic-potential loudspeaker.

11. The magnetic-potential loudspeaker of claim 1, wherein the elastic recovery device has a ring structure as a whole, the outer fixing portion has a closed ring shape, the inner fixing portion has a closed ring shape, and an elastic portion capable of elastic deformation is disposed between the outer fixing portion and the inner fixing portion.

12. The magnetic-potential loudspeaker of claim 1, wherein the diaphragm includes a central portion, a flexible deformation portion provided around the central portion, and a connection portion provided around the flexible deformation portion and connected with a bracket, wherein the magnetic conductive material is disposed on the central portion, and the flexible deformation portion has a thickness of 50 μm or less and a Young's modulus of 5800 MPa or less.

13. The magnetic-potential loudspeaker of claim 1, wherein the magnetic conductive material has a relative permeability μ of greater than 1000.

14. The magnetic-potential loudspeaker of claim 1, wherein the magnetic conductive material is composed of a plurality layers of film materials.

15. An electronic device, comprising the magnetic-potential loudspeaker of claim 1.

* * * * *